INVENTORS
FREDERICK B. SYLVANDER
WALTER PARFOMAK
ATTORNEY

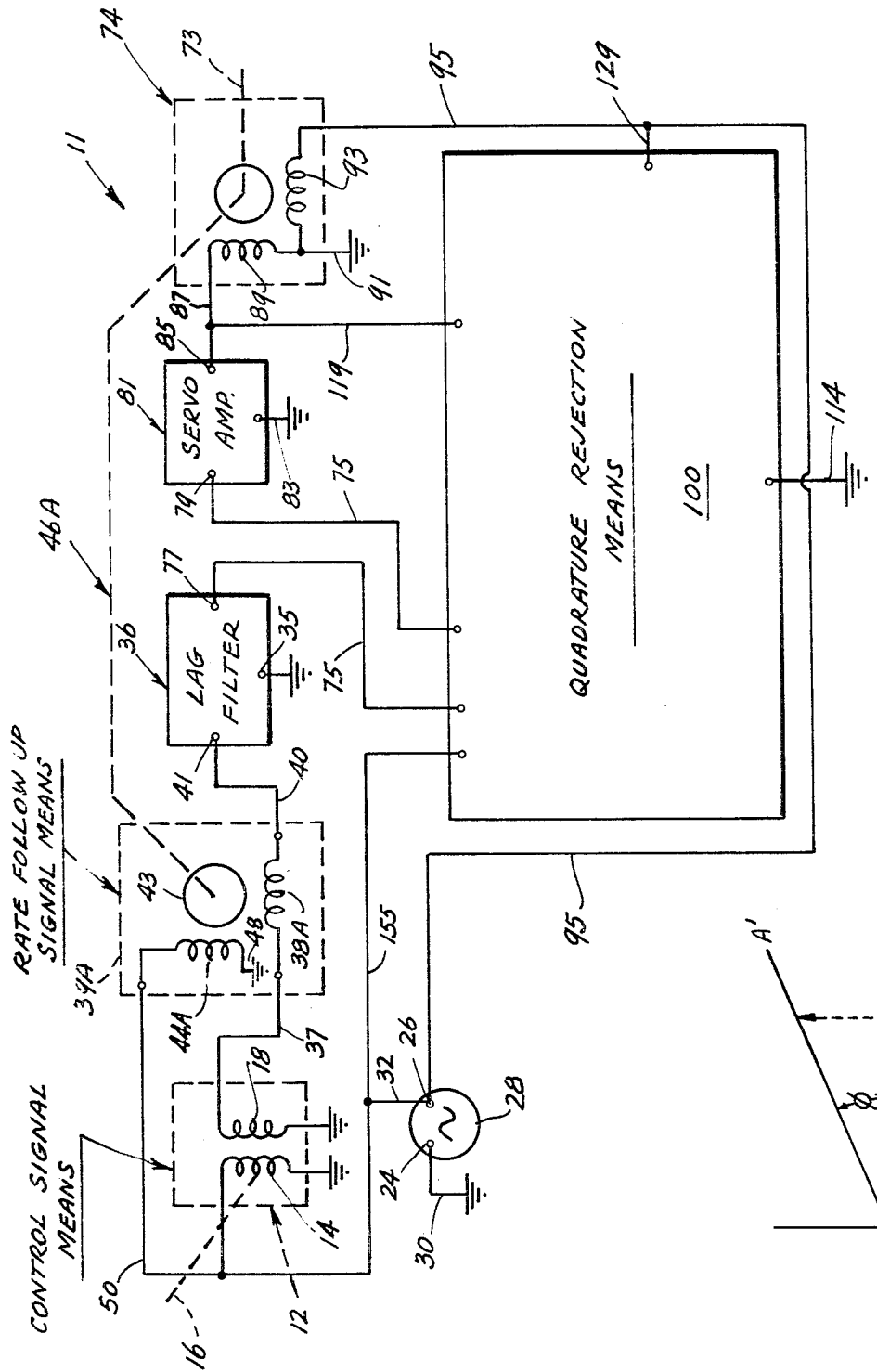

United States Patent Office 3,510,740
Patented May 5, 1970

3,510,740
TWO PHASE SERVOMECHANISM WITH A QUADRATURE REJECTION METHOD UTILIZING A SAMPLING PHASE SENSITIVE DEMODULATOR
Frederick B. Sylvander, Rutherford, and Walter Parfomak, Wallington, N.J., assignors to The Bendix Corporation, a corporation of Delaware
Filed July 6, 1967, Ser. No. 651,579
Int. Cl. G05b *11/12*
U.S. Cl. 318—28                               15 Claims

ABSTRACT OF THE DISCLOSURE

A quadrature rejection method and means for a servomechanism including a two phase servomotor having an input signal means and a follow-up signal means, each of which may be some type of alternating current transducer. The quadrature rejection method and means includes detection of the amount of quadrature voltage at the control winding of the two phase servomotor, that is a voltage of fundamental signal frequency which remains when the follow-up transducer is turned to a position or at a velocity which gives the minimum null at the fundamental signal frequency; and in response to the amount of the detected quadrature voltage controlling a source of quadrature correction voltage so as to feed back from the quadrature correction voltage source into the main signal chain an electrical feedback quadrature correction voltage which is of such a polarity as to buck out the quadrature voltage present.

BACKGROUND OF THE INVENTION

Field of the invention

The present invention relates to a quadrature voltage rejection method and means for servomechanism, including means for detection of the quadrature voltage present and feeding back an opposing correction voltage for wiping out the detected quadrature voltage.

The invention relates to the field of servoamplifiers in a servomechanism system of a two phase sevromotor type such as disclosed and claimed in a U.S. Pat. No. 3,103,615, granted Sept. 10, 1963 to Joseph O. Vitale and assigned to The Bendix Corporotion, assignee of the present invention. Such a servomechanism may be a positional or a rate servomechanism having an input signal means and a follow-up signal means, each of which may be some type of alternating current transducer applying opposing alternating current signal voltages to effect a controlling error signal.

However, the operative arrangement may be such that the input may be a control synchro connected in back to back relation to a synchro follow-up device as disclosed in the U.S. Pat. No. 3,103,615. In that case, it might well be that only a very small amount of quadrature voltage may appear in the system null voltage, and in such case, there would normally be little need for a quadrature voltage rejection means.

The term quadrature voltage as herein applied may be defined as a voltage of fundamental signal frequency which remains when the follow-up transducer is turned to a position or at a velocity which gives the minimum null at the fundamental signal frequency. In a normal system, quadrature is normally ninty degrees phase displaced from the usable in-phase error signal and is also of such a phase that it does not produce torque at the motor.

Quadrature voltage may be of material significance in a servo system in which an input alternating current signal voltage may come from a modulator, alternating current excited potentiometer, or alternating current inductive device, and a separate follow-up alternating current signal voltage comes from a potentiometer, synchro or chain of synchros, or rate generator as in the servo system to which the present invention relates.

In the latter type servo system, assuming that the follow-up voltage can vary to any magnitude along a phase AA′, as shown graphically by FIG. 3, and that the input alternating current signal voltage is of a different phase shown as OB in FIG. 3, it will be seen that in such a system with normally adjusted phase shifts, the minimum fundamental null which can be obtained is OB tan φ. This could be a very high quadrature voltage which would "swamp" the servoamplifier, decreasing its sensitivity to the desired in-phase error signal, and which would also result in a continuous high voltage being applied to the control winding of the motor causing an overheating of the motor. In the latter case, there is a definite need for means to wipe out or effect a rejection of such quadrature voltage.

DESCRIPTION OF THE PRIOR ART

Heretofore a common means utilized to reduce the effect of quadrature voltage has been the provision of a demodulator-modulator section in a servoamplifier as set forth, for example, at pages 175 through 177 of a book entitled "Linear Feedback System Design" by Shinners and published by J. Wiley & Sons, 1964. The main disadvantage of such a demodulator-modulator means resides in the fact that the ripple filtering required after the demodulator tends to harm the servo stability.

Other methods heretofore utilized, essentially short out the quadrature voltage component of an error or control signal while passing most of the in-phase component of the control signal. These methods also in turn usually require some type of filtering to restore the output waveform, have high harmonic content, and seldom give better than a 10:1 improvement in the signal to noise ratio.

The present invention provides a novel and superior method and a distinctly different idea of means of preventing the effects of high quadrature voltage at a null position in the control of a servo system of a two phase servomotor type having a fixed phase winding and a variable phase control winding.

SUMMARY OF THE INVENTION

The present invention contemplates a closed loop system, in which the gain of a servoamplifier for the servomotor may be utilized to control means to detect the amount of quadrature voltage at the variable phase control winding of the motor and feed a correction voltage back into the amplifier to negative the phase shifted quadrature voltage, thereby reducing the quadrature voltage to a very small percentage, such as 1%, of that which it would otherwise be without utilization of the present invention. Phase shifts of as much as twenty degrees between the input and follow-up signals will thus result in negligible "sloppiness" due to quadrature voltage.

An object of the invention is to provide a novel means and method for detecting quadrature voltage at a motor control winding, such as a phase sensitive demodulator transistor circuit to provide a pulsating direct current signal in response to the detected quadrature voltage to control a source of quadrature correction voltage so as to feedback into the main signal chain an opposing alternating current electrical correction voltage of such a selected polarity and phase as to buck out the quadrature voltage present in the main signal chain. Another object of the invention is to provide a quadrature voltage detection transistor circuit for effecting in response to the detected quadrature voltage a pulsating direct current output control signal, together with means to filter the control signal to remove ripple and apply the signal to control a feedback loop to effect a correction voltage to wipe out the detected quadrature voltage, the feedback loop in effect providing a one time constant loop so controlled by the direct current output signal that the filtering means improves the stability of the feedback system.

Another object of the invention is to provide a source of quadrature correction voltage, such as a normally balanced field effect transistor bridge network conrolled by the direct current output signal from the quadrature detection transistor circuit so as to provide as an output from the bridge an electrical feedback voltage for wiping out the quadrature voltage present in the main signal chain in an arrangement in which both the input and follow-up signal means, as well as the quadrature voltage detection transistor circuit, the bridge network of the source of quadrature correction voltage, and the fixed phase winding of the two phase servomotor are all energized from a common source of alternating current.

Another object of the invention is to provide in such a control system, a two phase servomotor having a fixed phase winding excited from the line phase provided by a main source of alternating current which also effects through a servo control system a ninety degree phase shift in a variable phase control signal voltage to effect energization of a control winding of the servomotor.

In addition, a quadrature voltage applied at the control winding of the motor and phase displaced ninety degrees relative to the control signal voltage will in effect be shifted one hundred and eighty degrees out of phase or in-phase relation with the line voltage, dependent upon the relation of the variable phase relation of the variable phase signal voltage, while the line voltage will in turn be utilized as a reference for the phase sensitive quadrature detector demodulator, as well as excite the field effect transistor bridge so as to selectively apply to the main signal chain an electrical feedback voltage one hundred and eighty degrees out of phase with the quadrature voltage detected in the main signal chain to effectively eliminate the detected quadrature voltage.

Another object of the invention is to provide a novel method and means for eliminating quadrature voltage by the provision of a feedback loop in which the gain of the servoamplifier of the main signal chain also provides the gain for the feedback loop with a quadrature voltage detection circuit being connected across the control winding of the servomotor, as well as the output of the servoamplifier so that while odd harmonics will be detected by the quadrature votlage detector circuit at the output of the servoamplifier, the amount of harmonics present at the control winding of the servomotor is the basic factor limiting the extent to which the quadrature voltage may be eliminated by this method and means, in that the fact that the odd harmonics may be erroneously detected as quadrature voltage can result only in an equivalent amount of quadrature voltage residual in the system which cannot cause system error, while in other known methods of quadrature rejection the harmonics result in the production of an in-phase error signal and a corresponding system error.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings in which corresponding numerals indicate corresponding parts:

FIG. 2 is a schematic wiring diagram illustrating the present invention as applied to a main signal chain of a rate servomotor control system.

FIG. 3 is a graphical illustration of the control and follow-up alternating current signal voltages applied to the signal chain of the servomotor control systems of FIGS. 1 and 2 and showing graphically the variance in electrical phases between the alternating current control signal voltage designated by a line O–B and the alternating current fow-up voltage designated by a line A–A' and showing that in such a system with normally adjusted phase shifts, the minimum fundamental null which may be obtained is OB tan $\phi$ which in the absence of the present invention might result in a sufficiently high voltage as to effectively "swamp" the servoamplifier of the system so as to decrease its sensitivity to the error signal and result in a continuously high quadrature voltage being applied to the variable phase control winding.

DESCRIPTION OF THE INVENTION

Figure 1:
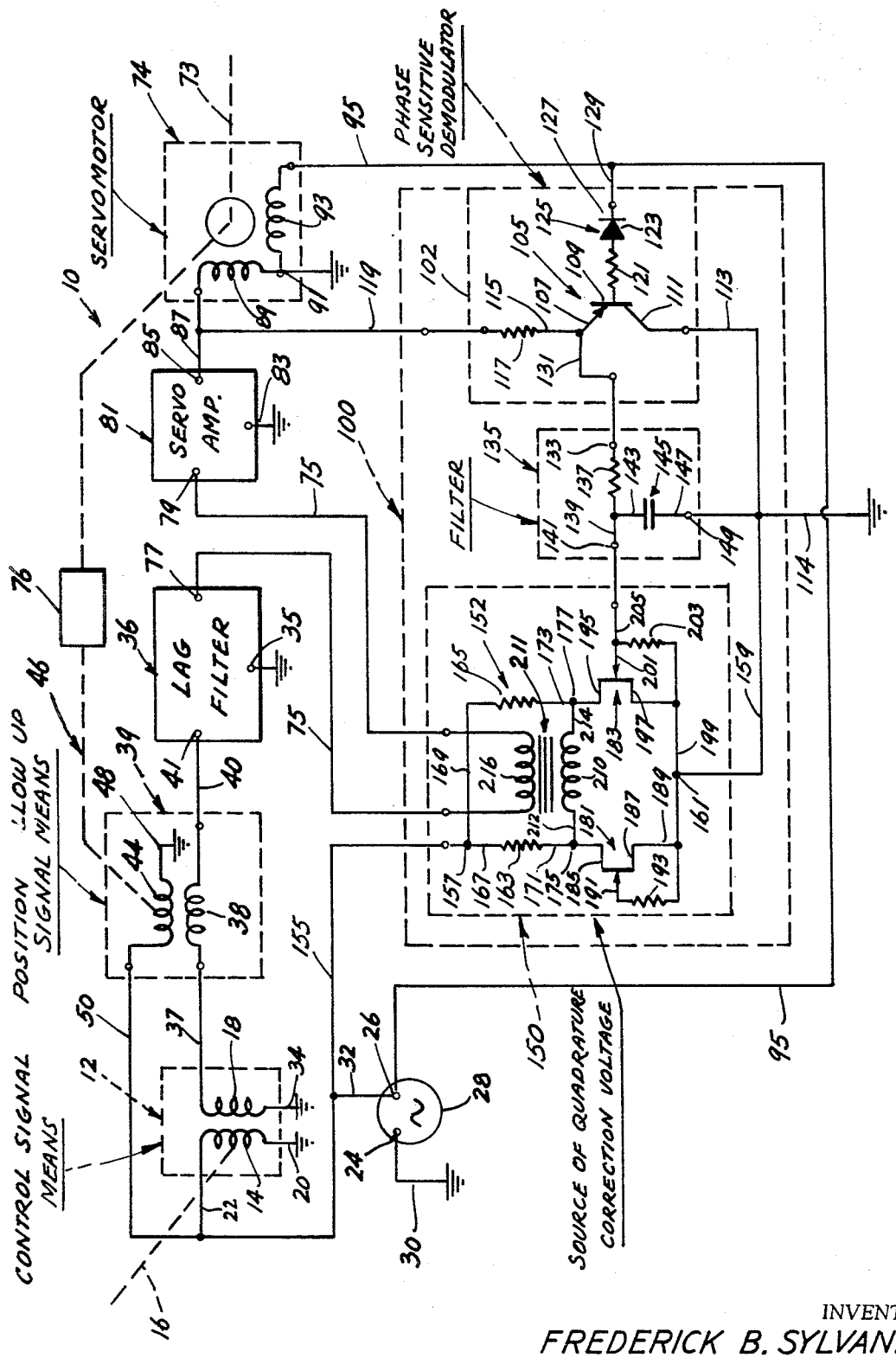
FIG. 1 is a schematic wiring diagram illustrating the present invention as applied to a main signal chain of a positional servomotor control system and embodying a phase sensitive demodulator, including a signal transistor circuit connected across a variable phase control winding of a two phase servomotor so as to provide a pulsating direct current output responsive to a sensed quadrature voltage at the control winding, the pulsating direct current output being applied through a filter network to remove ripple and to control a field effect transistor bridge so as to effect a feedback of a quadrature correction voltage to the main signal chain of a phase and amplitude acting in a sense to buck out the quadrature voltage sensed across the control winding of the two phase servomotor by the phase sensitive demodulator.

Referring to the drawings of FIG. 1 and 2, typical servomechanism system with which the present invention may be applied are indicated generally by the numerals 10 and 11. Such a servomechanism system may be a positional strvomotor control system 10, as shown by FIG. 1, or a rate of servomotor control system 11, as shown by FIGURE 2, including an input signal means and a follow-up signal means, each of which may be some type of alternating current transducer.

For example, the input signal means may be a synchro 12 which, as shown in FIG. 1, may include a rotor winding 14 angularly positioned by a control shaft 16 and inductively coupled to a stator winding 18. The rotor winding 14 may be electrically connected by a grounded conductor 20 aind a conductor 22 across output terminals 24 and 26 of a constant source of alternating current 28 with the output terminal 24 being connected to ground through a conductor 30 and the output terminal 26 being connected by a conductor 32 to the conductor 22.

The rotor winding 14 of the synchro 12 is angularly positioned in inductive relation to the stator winding 18 which is in turn connected through a grounded output conductor 34 to a grounded input-output terminal 35 of a lag filter 36 of conventional type and through an output conductor 37 to one terminal of a stator winding 38 of a follow-up signal means of synchro follow-up transformer 39. An opposite terminal of the stator winding 38 is connected by a conductor 40 to an input terminal 41 of the lag filter 36.

The follow-up synchro 39 has a rotor winding 44 inductively coupled to the stator winding 38 and angularly positioned by a shaft 46 relative to the stator winding 38 of the follow-up synchro 39. The rotor winding 44 is in turn electrically connected through an output grounded conductor 48 and through a conductor 50 across the respective output terminals 24 and 26 of the source of alternating current 28. The rotor winding 44 is arranged to induce in the stator winding 38 an alternating current voltage of opposite phase to that of the controlling signal voltage applied thereto by the synchro 12. The controlling signal voltage and the follow-up signal voltage induced in the winding 38 is there algebraically summed and a difference or error signal is applied across the input terminals 35 and 41 of the lag filter 36. The lag filter 36 is of a conventional type effective to shift the phase of the error signal voltage ninety degrees to effect operation of a dynamo electric machine or two phase servomotor 74 to drive the shaft 46 so as to position the rotor winding 44 in relation to the stator winding 38 to a position to null the error signal voltage, as hereinafter explained.

The two phase servomotor 74 is of a conventional variable speed reversible type responsive to the controlling error signal voltage to position a main control shaft 73 and through a reduction gearing 76 the angular position of the follow-up shaft 46 and thereby the rotor winding 44 to an angular position corresponding to that of the angularly adjusted rotor winding 14 of the input signal means 12 and at which a null error signal is effected at the input terminals 35 and 41 of the lag filter 36.

The lag filter 36 through which the error signal is phase-shifted ninety degrees to control the direction of rotation of the servomotor 74 includes an output conductor 75 which leads from an output terminal 77 of the lag filter 54 to an input terminal 79 of a servoamplifier 81 having a grounded input-output terminal 83. The servoamplifier 81 has an output terminal 85 connected through an output conductor 87 to one terminal of a variable phase control winding 89 of the servomotor 74 having an opposite terminal connected through a conductor 91 to ground. A fixed phase winding 93 of the servomotor 74 is also connected at one terminal to the grounded conductor 91 while an opposite terminal is connected through a conductor 95 to the output terminal 26 of the source of alternating current 28 so that the fixed phase winding 93 is effectively connected across the output terminals 24 and 26 of the source of alternating current 28. The variable phase control winding 89 of the servomotor 74 is connected through the output conductor 87 and the grounded output conductor 83 across the output of the servoamplifier 81.

The lag filter network 36 effects a phase displacement or difference of ninety degrees in the phase of the controlling error signal relative to the main current or main field of the line phase applied to the fixed phase winding 93 so that the said fields form together a rotating field of sufficient magnitude to effect rotation of the servomotor 74 in a direction dependent on the phase direction of the alternating current voltage of the controlling error signal at the input side of the servoamplifier 81. This phase direction will then selectively cause the motor to rotate in a clockwise or counterclockwise direction, as explained in a U.S. Pat. No. 1,586,233, granted May 25, 1926 to Hermann Anschutz-Kaempfe.

In a servomechanism system 10, such as heretofore described, varying amounts of quadrature voltage may appear in the system even though the error signal be at a null voltage. Such quadrature voltage may be defined as a voltage of fundamental signal frequency such as indicated graphically at FIG. 3 which may remain in the output applied across the variable phase control winding 89 of the servomotor 74 when the follow-up transducer 39 is turned to a position which gives a minimum null at the fundamental signal frequency. In such a system the quadrature voltage is normally an additional ninety degrees in phase displaced from the usable error signal and is also of such a phase that it does not produce torque at the servomotor 74.

In such a system, an input signal may come from a modulator, alternating current excited potentiometer, or an alternating current inductive device such as synchro 12 of FIG. 1, or synchro 12A of FIG. 2, while there may be further provided a follow-up signal coming from a potentiometer, synchro, chain of synchros, or rate generator, such as the follow-up synchro 39 of FIG. 1 or the follow-up rate generator 39A of FIG. 2.

It has been found that, as shown graphically by FIG. 3, the follow-up voltage may well vary in magnitude along the phase A–A', while the input signal is of a different phase, shown as O–B. In such a system with normally adjusted shifts, the minimum fundamental null which may be obtained in OB tan $\phi$, as shown graphically in FIG. 3. Under some operating conditions, this could be a very high voltage which would in effect "swamp" the servoamplifier 81 of FIG. 1 or servoamplifier 81 of FIG. 2, decreasing its sensitivity to the desired in-phase error signal and result in a continuous high voltage or voltage quadrature being applied to the motor control winding 89 of FIG. 1 or 89 of FIG. 2 causing an overheating of the motor.

QUADRATURE REJECTION METHOD AND MEANS FOR SERVOMECHANISM SYSTEM

The present invention provides a novel method and superior means for preventing the adverse effects of such a high quadrature null voltage on the control winding 89 of a two phase servomotor 74. The novel quadrature rejection means embodying the present invention is shown diagrammatically in FIG. 1 and indicated generally by numeral 100.

In the servomechanism system 10 shown in FIG. 1, it will be seen that since the quadrature voltage and the error signal voltages are of the same frequency provided by the common source of alternating current 28, no linear passive wave filter may be effective to distinguish between the two, the quadrature voltage and the error signal voltage.

In the present invention, there is provided a closed loop system which utilizes the gain of the servoamplifier 81 to facilitate detection of the amount of the quadrature voltage at the control winding 89 of the servomotor 74 and in turn control a feedback of an alternating current quadrature correction voltage into the servoamplifier 81 and negatively applied to the quadrature voltage so as to reduce to a very small percentage the detected quadrature voltage such as, for example, one percent of that which it would otherwise be without the features provided by the present invention.

Through the provision of the quadrature rejection method and means of the present invention, phase shifts of as much as twenty degrees between the input signal voltage and the follow-up signal voltage will result in negligible "sloppiness" due to quadrature voltage.

In the present invention, a means of detecting the quadrature voltage at the motor control winding 89 may be a phase sensitive demodulator such as the single transistor circuit shown in FIG. 1 and indicated by the numeral 102. Such phase sensitive demodulator circuit 102 may include a PNP type transistor 105 having an emitter element 107, a base element 109 and a collector element 111. The collector element 111 is connected through a conductor 113 to a grounded conductor 114, while the collector element 107 is connected through a conductor 115, resistor 117 and conductor 119 to the output conductor 87 leading from the output terminal 85 of the servoamplifier 81 to a terminal of the control winding 89 of the servomotor 74, while an opposite terminal of the control winding 89 is connected to ground through the conductor 91. Thus the emitter element 107 and collector element 111 of the PNP type transistor 105 are connected across the control winding 89 of the servomotor 74. The base element 109 of the PNP type transistor 105 is connected through a resistor 121 to an anode element 123 of a diode 125 having a cathode element 127 connected through a conductor 129 to the conductor 95 leading from the output terminal 26 of the source of alternating current 28 having an opposite terminal 24 connected to ground through the conductor 30 and thereby through the grounded conductor 113 to the collector element 111 of the transistor 105. Output conductor 131 leads from the emitter element 107 of the phase sensitive demodulator transistor 105 to an input terminal 133 of an electrical filter network 135. The filter network 135 includes a resistor element 137 connected between the input terminal 133 and a conductor 139 leading to an output terminal 141 of the filter network 135. A conductor 143 leads from the conductor 139 to one plate of a filter capacitor 145 having an opposite plate connected through a conductor 147 to a grounded input-output terminal 149 of the filter network 135.

The phase sensitive demodulator 102 is responsive then to the frequency of the source of alternating current 28 connected across the conductors 129 and 113 of the PNP type transistor 105 and is rendered periodically conductive and nonconductive in response to the phase of the alternating current reference provided by the source 28 to sample the voltage applied to control winding 89 of servomotor 74. This in turn causes a pulsating direct current signal to be applied across the output lines 131 and 113 which will be of a selected phase dependent upon the phase of the sensed quadrature voltage and will vary in amplitude dependent upon the amplitude of the quadrature voltage detected across the control winding 89 of the servomotor 74.

The pulsating direct current output applied then through the output conductor 131 to the input terminal 133 of the filter network 135 is filtered by the filter network 135 so as to remove ripple therefrom and since the feedback loop thus effected through the phase sensitive demodulator 102 is in effect a one time constant loop, this filtering effected by the filter network 135 will improve the stability of the feedback loop of the quadrature voltage rejection means 100, as will be hereinafter explained in greater detail.

The pulsating direct current signal thus applied through the filter network 135 in response to the quadrature voltage sensed across the control winding 89 is utilized to control a source of quadrature correction voltage indicated generally by the numeral 150, and which as shown in FIG. 1, may be a normally balanced field effect transistor bridge network 152.

The bridge network 152 is connected across the source of alternating current 28 through a conductor 155 leading from the output terminal 26 of the source of alternating current 28 to an input terminal 157 of bridge network 152, while the opposite grounded terminal 24 of the source of alternating current 28 is connected through the grounded conductor 114 to a conductor 159 leading to an opposite input terminal 161 of the bridge network 152. The bridge network 152 has opposite arms provided by resistor elements 163 and 165 connected by conductors 167 and 169 to the input terminal 157 while opposite ends of the resistor arms 163 and 165 are connected by conductors 171 and 173 to output terminals 175 and 177 of the bridge network 152.

Further, opposite arms of the bridge network 152 are provided by field effect transistors 181 and 183. The field effect transistor 181 has a drain element 185 connected to the output terminal 175 and a source element 187 connected by a conductor 189 to the terminal 161. A gate element 191 is connected through the resistor 193 to the conductor 189.

Similarly, the field effect transistor 183 has a drain element 195 connected to the output terminal 177, a source element 197 connected through a conductor 199 to the grounded terminal 161. The field effect transistor 183 also has a gate element 201 connected through a resistor 203 to the conductor 199 leading to the input terminal 161 and further leading to the gate element 201 is a conductor 205 which is connected to the output terminal 141 of the filter network 135. The balance of the bridge network 152 is controlled by the pulsating direct current signal applied by the phase sensitive demodulator 102 through the filter network 135 to the gate element 201 for in turn varying the conductivity of the noted transistor 183 which unbalances the bridge network in opposite selected senses dependent upon the phase relation of the sensed quadrature voltage to that of the line voltage.

Thus, upon the bridge network 152 being unbalanced in one of said selected senses an alternating current output signal of one selected phase is applied across the output terminals 175 and 177 to a primary winding 210 of an induction transformer 211 connected between the terminals 175 and 177 through conductors 212 and 214, respectively, while upon the bridge network 152 being unbalanced in the other of said selected senses an alternating current output signal of an opposite selected phase is applied across the output terminals 175 and 177 to the primary winding 210.

The primary winding 210 of the transformer 211 is inductively coupled to a secondary winding 216 serially connected in the output conductor 75 leading from the output terminal 77 of the lag filter network 54 to the input terminal 79 of the servoamplifier 81 for the servomotor 74.

The selected alternating current quadrature correction voltage thus induced in the secondary winding 216 is then fed into the main signal chain and algebraically summed with the quadrature voltage applied to the line 75. The selected phase sense of the alternating current quadrature correction voltage will be of such a selected polarity as to buck out the quadrature voltage applied in the line 75 and thereby eliminate the quadrature voltage applied through the servoamplifier 81 across the control winding 89 of the servomotor 74 and sensed by the phase sensitive demodulator 102.

In the servomechanism system shown by FIG. 1, the fixed phase winding 93 of the servomotor 74 is excited from the line phase as effected by the source of alternating current 28, while the controlling signal phase applied through the lag filter network 36 of the servomechanism system 10 to the control winding 89 is also derived from the source 28 and phase shifted ninety degrees by the lag filter network 54. The quadrature voltage appearing at the control winding 89 will be displaced ninety degrees from that of the controlling signal phase as heretofore explained and in addition the quadrature voltage will be shifted an additional ninety degrees by the action of the lag filter 36. Thus the quadrature voltage at the control winding 89 will be of line frequency and in-phase or one hundred and eighty degrees out of phase with the line voltage dependent upon the phase relation of the controlling signal or error voltage.

Further, the line voltage derived from the source 28 provides a reference voltage for operating the phase sensitive demodulator 102 and is connected across the fixed phase winding 93 of the motor 74 through the respective conductors 129–95 and the grounded conductors 113–91. Moreover, the line phase effected by the source of alternating current 28 is also applied as a reference voltage across the input conductors 155 and 159 to excite the field effect transistor bridge network 152. The servo-amplifier 81 is of a type providing approximately zero phase shift so that the source 28 thus provides proper reference voltages for the foregoing operation.

In the servomechanism system 10, the phase shift of the signal is provided by the lag filter network 36 of conventional type after the summation of the error and feedback signals and before the input to the servoamplifier 81 thereby giving the required ninety degree phase shift of the usable error signal voltage. This filtering of the error signal voltage by the filter network 36 may be advantageously done by a lag type filter in order to attenuate harmonic content of the error signal. Since odd harmonics will be detected by the quadrature voltage detection section 102, the amount of harmonics present at the motor control winding 89 is a basic factor limiting the extent to which quadrature voltage may be eliminated by this means and method.

In the present invention by the provision of the gain of the servoamplifier 81 as the gain of the quadrature rejection means 100, odd harmonic signals which may be detected erroneously as quadrature voltage can result only in an equivalent amount of quadrature voltage residual in this system which cannot cause system error. In other known methods and means of quadrature voltage rejection, such harmonics may result in the production of an in-phase error signal voltage and a corresponding system error which is not true in the present invention.

RATE SERVOMOTOR CONTROL SYSTEM

In the rate servomotor control system 11 of FIG. 2 there is provided a rate follow-up signal means 39A instead of the position follow-up signal means 39 of FIG. 1. The rate follow-up signal means includes a rate generator of conventional type having a rotor element 43 driven by the servomotor 74 directly through a shaft 46A at a speed corresponding to that of the variable speed reversible servomotor 74.

The rate generator 39A has a fixed phase winding 44A connected by a grounded conductor 48 and a conductor 50 across the respective output terminals 24 and 26 of the source of alternating current 28 and a variable phase winding 38A connected at one terminal to an output conductor 37 leading from the control signal means or synchro 12 while the opposite terminal of the winding 38A is connected by a conductor 40 to the input terminal 41 of the lag filter network 36.

The rate generator 39A is driven by the servomotor 74 in a direction and at a speed controlled by the error signal voltage applied across the variable phase control winding 89. The arrangement is such that the rate generator 39A applies to the variable phase winding 38A a follow-up signal voltage of a phase opposite to that of the control signal voltage and of a magnitude depending upon the speed of the variable speed servomotor 74 which is combined with the controlling signal voltage to effect an error signal voltage acting in a sense to regulate the speed of the servomotor 74 to a speed at which the control and follow-up voltages are balanced to effect a null error signal voltage.

The quadrature rejection means indicated generally by the numeral 100 is of corresponding structure to that heretofore described with reference to FIG. 1 and the operation thereof follows that of FIG. 1, as hereinafter explained.

OPERATION

In the operation of the quadrature rejection means and method of the present invention, the signal applied by the source of the quadrature correction signal 100 is fed into the main signal chain at the conductor 75 by the transformer 211 and combined with the input and follow-up signals in such polarity as to buck out the quadrature voltage there present. The quadrature correction signal is applied between the lag filter network 36 and the servoamplifier 81.

The lag filter network 36 provides a ninety degree phase shift in the usable error signal resulting from the difference between the input signal voltage provided by the synchro 12 and the opposing follow-up signal voltage provided by the follow-up synchro 39 of FIG. 1 or the rate generator 39A of FIG. 2 acting in a sense opposing the controlling signal voltage in a conventional manner to effect a resultant signal error voltage. This signal error voltage is then applied through the lag filter network 36 which serves to attenuate the harmonic content of the error signal, as well as provide a ninety degree phase shift in the error signal which is then applied through the servoamplifier 81 to effect a controlling action of the servomotor 72 by energization of the control winding 89 in a conventional manner.

In addition, however, to the controlling signal error voltage applied to the control winding 89 of the servomotor 74, there is applied to the control winding 89 the quadrature signal voltage, as heretofore noted, which is normally ninety degrees phase displaced from that of the usable error signal voltage applied to the control winding 89.

This ninety degrees phase shift in the quadrature voltage of the usable signal error voltage is detected by the quadrature detection section 102 or phase sensitive demodulator which is operated by the alternating current reference effected by the alternating current source 28, which also serves to energize the field effect transistor bridge network 152.

Now since the usable error signal voltage will be phase shifted by the lag filter network 36, the required ninety degrees from that of the alternating current supplied by the source 28 to the fixed phase winding 93 so as to effect the controlling action through the servoamplifier 81 on the control winding 89 of the servomotor 74 and further since the quadrature voltage is also phase displaced ninety degrees from the usable error signal voltage, this quadrature voltage will in effect be either in-phase or out of phase one hundred and eighty degrees relative to the phase of the alternating current applied from the source 28 dependent of course upon the sense of the error signal voltage.

It will be clear then that the alternating current reference voltage applied by the source 28 across the collector 111 and base 109 of the PNP type transistor 105 and through the diode 125 will cause the transistor 105 connected across the control winding 89 to alternately increase and decrease the conduction of transistor 105 in step with the phase of the alternating current source 28 and in step with the phase of the quadrature voltage applied across the control winding 89 which will in turn cause a pulsating direct current to be applied across the output lines 131 and 113 of the transistor 105 of a phase dependent upon the phase sense of the quadrature voltage applied across the winding 89 and of an amplitude corresponding to that of the sensed quadrature voltage.

This output pulsating direct current voltage is in turn applied through the filter network 135 to remove the ripple voltage and in turn to the gate element 201 of the field effect transistor 83 to cause an unbalancing of the field effect transistor bridge 152 in a sense dependent upon whether the quadrature voltage applied across the control winding 89 of the servomotor 74 and sensed by the phase sensitive demodulator 102 is in-phase or one hundred and eighty degrees out of phase with that of the reference voltage applied to the transistor 105 by the source 28. This unbalancing of the field effect transistor bridge network 152 will in turn cause an alternating current signal to be induced in the secondary winding 216 of a selected phase acting in a sense to oppose or wipe out the quadrature voltage appearing in the main signal chain to in turn eliminate the quadrature voltage sensed across the control winding 89 of the servomotor 74.

Although two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a servomechanism system of a type including a dynamo electric machine having a fixed phase winding and a variable phase control winding, a main signal chain including an amplifying unit having an input and an output, the output of the amplifying unit being electrically connected to the control winding, a source of alternating current, a signal generating means energized from said source of alternating current to apply an alternating current signal of a selected phase relation to the input of said amplifying unit for energizing the variable phase control winding at the output thereof, other means connecting said source of alternating current to energize the fixed phase winding of said dynamo electric machine, said main signal chain including phase displacement means to effect a displacement of substantially ninety degrees in the phase of the alternating current signal energizing the control winding of the dynamo electric machine to cause rotation of the dynamo electric machine in a direction dependent upon the selected phase relation of the alternating current signal; the improvement comprising means for sensing quadrature voltage applied across the control winding of the dynamo electric machine including a phase sensitive demodulator operatively connected to the control winding of the dynamo electric machine and providing a pulsating direct current output voltage corresponding to the quadrature voltage, said quadrature voltage being displaced an additional ninety degrees from the phase of the signal voltage applied at the control winding of the dynamo electric machine, and a quadrature voltage correction means operatively controlled by the quadrature voltage sensing means for applying a correction voltage in the main signal chain acting in a sense to substantially eliminate the sensed quadrature voltage.

2. The improvement defined by claim 1 in which the quadrature voltage sensing means includes a transistor having an emitter element, a collector element and a base, the control winding of the dynamo electric machine being electrically connected between the emitter and collector elements, respectively, of the transistor, other means electrically connecting the base of the transistor to the source of alternating current so as to cause operation of the transistor in synchronism with the quadrature voltage applied across the control winding to effect the pulsating direct current output voltage across said elements of a phase and amplitude to control the quadrature voltage correcting means in a sense to substantially eliminate the sensed quadrature voltage.

3. The improvement defined by claim 1 in which the quadrature voltage correction means includes inductive coupling means operatively connected in the main signal chain between the phase displacement means and the amplifying unit for applying the correction voltage acting in a phase sense in opposition to the quadrature voltage for effectively eliminating the quadrature voltage sensed at the variable phase control winding of the dynamo electric machine.

4. The improvement defined by claim 1 in which the quadrature voltage correction means includes a normally balanced bridge network energized by said source of alternating current, means to control the bridge network operatively connected to the quadrature voltage sensing means to unbalance the bridge network in a sense dependent upon the sensed quadrature voltage so as to apply the alternating current from the source as a correction voltage in the main signal chain acting in a sense to oppose the quadrature voltage and of an amplitude to substantially eliminate the sensed quadrature voltage.

5. The improvement defined by claim 1 in which the quadrature voltage correction means includes a normally balanced bridge network having an input and an output, the input of the bridge network being operatively connected to hte source of alternating current, a field effect transistor to control the bridge network, the field effect transistor having a gate element, means operatively connecting the quadrature voltage sensing means to the gate element to selectively unbalance the bridge network in opposite senses dependent upon the sensed quadrature voltage, inductive coupling means operatively connecting the output of the bridge network in the main signal chain between the phase displacement means and the amplifying unit so as to apply upon the unbalancing of the bridge network the alternating current from the source as a correction voltage acting in a phase sense in opposition to the qhadrature voltage and of an amplitude to substantially eliminate the quadrature voltage sensed at the variable phase control winding of the dynamo electric machine.

6. The improvement defined by claim 1 in which the quadrature voltage sensing means includes a phase sensitive demodulator operatively connected across the control winding of the dynamo electric machine, and the quadrature voltage correction means includes a normally balanced bridge network having an input and an output, the input of the bridge network being energized by said source of alternating current, means to control the bridge network operatively connected to the quadrature voltage sensing means to unbalance the bridge network in a sense dependent upon the sensed quadrature voltage, inductive coupling means operatively connecting the output of the bridge network in the main signal chain between the phase displacement means and the amplifying means so as to apply upon the unbalancing of the bridge network the alternating current from the source as a correction voltage acting in a phase sense in opposition to the quadrature voltage and of an amplitude to substantially eliminate the quadrature voltage sensed at the variable phase control winding of the dynamo electric machine.

7. The improvement defined by claim 1 in which the quadrature voltage sensing means includes a transistor having an emitter element, a collector element and a base, the control winding of the dynamo electric machine being electrically connected across the emitter and collector elements, respectively, of the transistor, other means electrically connecting the base to the source of alternating current so as to provide operation of the transistor in synchronism wih the quadrature voltage applied across the control winding to effect a pulsating direct current output voltage across said elements to control the quadrature voltage correcting means, and the quadrature voltage correction means includes a normally balanced bridge network having an input and an output, the input of the bridge network being electrically connected to the source of alternating current, a field effect transistor to control the bridge network, the field effect transistor having a gate element, means electrically connecting the output of the transistor of the quadrature voltage sensing means to the gate element of the field effect transistor to selectively unbalance the bridge network in opposite senses dependent upon the sensed quadrature voltage, means to inductively couple the output of the bridge network in the main signal chain between the phase displacement means and the amplifying unit so as to apply upon the unbalancing of the bridge network the alternating current from the source as a correction voltage acting in a sense to oppose the quadrature voltage and of an amplitude to substantially eliminate the quadrature voltage sensed at the variable phase control winding of the dynamo electric machine.

8. In a method of controlling a dynamo electric machine having a variable phase control winding, said method including the steps of applying to the control winding from a source of alternating current an alternating voltage signal of a varying amplitude and selected phase to control speed and direction of rotation of the dynamo electric machine; the improvement comprising the steps of sampling at intervals in synchronism with said source of alternating current a quadrature voltage applied across the control winding and displaced ninety degrees in phase from the alternating voltage signal, converting the sample quadrature voltage to a pulsating direct current signal voltage of a phase dependent upon the phase of the sample quadrature voltage, and converting the direct current signal voltage to an alternating correction voltage of a phase in opposition to the quadrature voltage to decrease the quadrature voltage applied across the control winding.

9. The improvement defined by claim 8 including the additional step of controlling the alternating current from said source by said pulsating direct current signal voltage so as to provide an alternating correction voltage of a phase in opposition to the quadrature voltage to decrease the quadrature voltage applied across the control winding.

10. The improvement defined by claim 8 including the additional step of selectively inverting the alternating current from said source of alternating current in response to the selected phase of the pulsating direct current signal voltage so as to provide an alternating correction voltage of a phase in opposition to the phase of the quadrature voltage and of an amplitude varying with that of the sample quadrature voltage to substantially decrease the quadrature voltage applied across the control winding.

11. In a method of controlling a dynamo electric machine having a variable phase control winding and a fixed phase winding, said method including the steps of applying from a source an alternating current for energizing said fixed phase winding, applying from said source to said control winding an alternating current signal of varying amplitude and of a selected phase displaced ninety degrees from the phase of the alternating current energizing said fixed phase winding to control speed and direction of rotation of the dynamo electric machine; the improvement comprising the steps of sampling at periodic intervals in synchronism with said source of alternating current a quadrature voltage applied across the control winding and displaced ninety degrees in phase relative to the phase of the alternating current control signal energizing said control winding, converting the sample quadrature voltage to a pulsating direct current signal voltage of a selected phase dependent upon the phase of the sampled quadrature voltage, selectively inverting alternating current from said source in response to the selected phase of the direct current signal voltage so as to povide an alternating correction voltage of a phase in opposition to the phase of the quadrature voltage and of an amplitude varying with that of the sample quadrature voltage to substantially decrease the quadrature voltage applied across the control winding.

12. In a control system of a type including an electric motor and a control winding for controlling rotation of the motor; the combination comprising a control network for the winding including means for supplying an alternating current signal for controlling rotation of the motor, a feedback network including means for periodically sampling in synchronism with said alternating current a quadrature voltage applied across the control winding and displaced ninety degrees in phase relative to said alternating current signal and providing a pulsating direct current output corresponding to the sample quadrature voltage, and means responsive to said pulsating direct current output for supplying a feedback alternating current voltage having a phase relation acting in opposition to said quadrature voltage and of a magnitude proportional to the sample quadrature voltage to effectively eliminate the quadrature voltage at the control winding.

13. The combination defined by claim 12 including an amplifying unit common to both the control and the feedback networks for amplifying the alternating current control signal and the quardature voltage applied at the control winding of the motor.

14. The combination defined by claim 12 in which the means responsive to said pulsating direct curernt output includes a normally balanced bridge network, means for controlling the balance of the bridge network and effective to unbalance the bridge network in one sense upon the pulsating direct curernt output having one phase relation and to unbalance the bridge network in an opposite sense upon the pulsating direct current output having an opposite phase relation, and output means effective upon the unbalancing of said bridge network for supplying the feedback alternating current voltage having a phase relation acting in opposition to said quadrature voltage and of a magnitude proportional to the pulsating direct current output to effectively eliminate the quadrature voltage at the control winding.

15. The combination defined by claim 13 in which the means responsive to said pulsating direct current output includes a normally balanced bridge network, means for controlling the balance of the bridge network and effective to unbalance the bridge network in one sense upon the pulsating direct current output having one phase relation and to unbalance the bridge network in an opposite sense upon the pulsating direct current output having an opposite phase relation, and output means effective upon the unbalancing of said bridge network for supplying the feedback alternating current voltage having a phase relation acting in opposition to said quadrature voltage and of a magnitude proportional to the pulsating direct current output to effectively eliminate the quadrature voltage at the control winding.

References Cited

UNITED STATES PATENTS

| 2,671,875 | 3/1954  | Urbanik   | 318—20.515 XR |
| 2,832,020 | 4/1958  | Towner    | 318—20.515 XR |
| 3,084,320 | 4/1963  | Hoffman   | 318—20.515 XR |
| 3,156,915 | 11/1964 | Lang      | 318—20.515 XR |
| 3,204,125 | 8/1965  | Beckerich | 318—20.515 XR |
| 3,246,221 | 4/1966  | Rabier    | 318—20.515 XR |

ORIS L. RADER, Primary Examiner

A. G. COLLINS, Assistant Examiner

U.S. Cl. X.R.

328—166